United States Patent
Porteous (10) Patent No.: US 12,551,369 B2
(45) Date of Patent: Feb. 17, 2026

(54) OPHTHALMIC DEVICE

(71) Applicant: NEW WORLD MEDICAL, INC., Rancho Cucamonga, CA (US)

(72) Inventor: Eric Porteous, Corona, CA (US)

(73) Assignee: NEW WORLD MEDICAL, INC., Rancho Cucamonga, CA (US)

( * ) Notice: Subject to any disclaimer, the term of this patent is extended or adjusted under 35 U.S.C. 154(b) by 192 days.

(21) Appl. No.: 18/268,547

(22) PCT Filed: Jan. 7, 2022

(86) PCT No.: PCT/US2022/011708
§ 371 (c)(1),
(2) Date: Jun. 20, 2023

(87) PCT Pub. No.: WO2022/150650
PCT Pub. Date: Jul. 14, 2022

(65) Prior Publication Data
US 2024/0041646 A1   Feb. 8, 2024

Related U.S. Application Data (60) Provisional application No. 63/136,031, filed on Jan. 11, 2021.

(51) Int. Cl.
*A61F 9/00* (2006.01)
*A61B 17/00* (2006.01)
*A61B 17/34* (2006.01)

(52) U.S. Cl.
CPC .. *A61F 9/0017* (2013.01); *A61B 2017/00367* (2013.01); *A61B 17/3496* (2013.01)

(58) Field of Classification Search
CPC ...... A61F 9/0017; A61F 9/0008; A61F 2/958; A61F 2/2418; A61F 2/04; A61F 2/24;
(Continued)

(56) References Cited

U.S. PATENT DOCUMENTS

| | | | |
|---|---|---|---|
| 8,540,659 B2 * | 9/2013 | Berlin | A61F 9/00781 604/8 |
| 9,237,883 B2 * | 1/2016 | Sundheimer | A61B 10/0233 |

(Continued)

FOREIGN PATENT DOCUMENTS

| | | |
|---|---|---|
| CN | 110087569 A | 8/2019 |
| JP | 2017505686 A | 2/2017 |

(Continued)

OTHER PUBLICATIONS

International Search Report and Written Opinion for Application No. PCT/US2022/011708, dated Apr. 12, 2022, 10 pages.
(Continued)

*Primary Examiner* — Philip R Wiest
*Assistant Examiner* — Brandon W. Levy
(74) *Attorney, Agent, or Firm* — MASCHOFF BRENNAN (57) ABSTRACT

An ophthalmic device including a cannula having a cannula distal end, a lumen, and at least one fluid outlet is provided. The cannula is configured to deliver a fluid. A sleeve is disposed around the cannula and has a sleeve distal end. A handle is coupled to the sleeve and the cannula, the handle having an actuator. An internal mechanism is coupled to the actuator and configured to retract the sleeve relative to the cannula.

18 Claims, 6 Drawing Sheets

(58) Field of Classification Search
CPC ........ A61F 2/07; A61F 2/2475; A61F 2/2436; A61F 9/00736; A61F 9/00781; A61F 9/007; A61B 17/3496; A61B 2017/00367; A61B 17/11; A61B 17/1114; A61B 17/12036; A61B 17/1204; A61B 17/12172; A61B 17/12177; A61B 2017/1139; A61B 17/3468; A61B 17/32053; A61B 10/0233; A61M 2210/0612; A61M 5/3286; A61M 5/3291; A61M 27/002; A61M 2039/064; A61M 2039/0653; A61M 2039/0646; A61M 2039/0666; A61M 2210/125

See application file for complete search history.

(56) References Cited

U.S. PATENT DOCUMENTS

2012/0078224 A1* 3/2012 Lerner .................. A61F 9/0017
604/218

2012/0271272 A1* 10/2012 Hammack ........... A61F 9/00727
604/257
2020/0129334 A1 4/2020 Kahook et al.
2020/0179606 A1 6/2020 Weinstein et al.

FOREIGN PATENT DOCUMENTS

| JP | 2020501739 A | 1/2020 | |
|---|---|---|---|
| NL | 2019483 B1 * | 3/2019 | .......... A61M 3/0279 |
| WO | 2017143272 A2 | 8/2017 | |
| WO | WO-2018118817 A1 | 6/2018 | |

OTHER PUBLICATIONS

European Office Action for Application No. 22701492.5, dated Jun. 30, 2025, 6 pages.

Chinese Office Action for Application No. 202280019443.8, dated Dec. 22, 2025, 14 pages including translation.

Japanese Office Action for Application No. 2023-541266, dated Oct. 16, 2025, 6 pages including translation.

* cited by examiner

OPHTHALMIC DEVICE

CROSS-REFERENCES TO RELATED APPLICATIONS

This Application claims the benefit of International Application No. PCT/US2022/011708, entitled "OPHTHALMIC DEVICE," filed on Jan. 7, 2022, which claims the benefit of U.S. Provisional Patent Application No. 63/136,031 entitled "OPHTHALMIC DEVICE," filed on Jan. 11, 2021, each disclosure of which is hereby incorporated by reference in its entirety for all purposes.

TECHNICAL FIELD

The present disclosure generally relates to medical devices and procedures, and more particularly, to an ophthalmic device.

BACKGROUND

Glaucoma is a disease resulting from an increase in intraocular eye pressure (TOP). IOP may increase when natural drainage of the eye (e.g., drainage of the humus of the eye) is prevented, reduced, or otherwise blocked. Cavities in front of (e.g., on top of) the lens of the eye are filled with a viscous fluid called aqueous humor. A continuous flow of aqueous humor through the eye provides nutrition to portions of the eye (e.g., the cornea and the lens) that have no blood vessels. This flow of aqueous humor also removes waste (e.g., foreign object debris) from these tissues. In a healthy eye, a stream of aqueous humor drains out of the anterior chamber of the eye through the trabecular meshwork and into Schlemm's canal as new aqueous humor is secreted by the epithelial cells of the ciliary body. The drained aqueous humor enters the venous blood stream from Schlemm's canal and is carried along with the venous blood leaving the eye. When the natural drainage mechanisms of the eye (e.g., Schlemm's canal and/or the trabecular meshwork) stop functioning properly, the IOP begins to increase. Accordingly, it is desirable to provide ophthalmic devices having distal tips for delivering a fluid to the eye.

BRIEF DESCRIPTION OF THE DRAWINGS

The accompanying drawings, which are included to provide further understanding of the disclosure and are incorporated in and constitute a part of this specification, illustrate embodiments of the disclosure and together with the description serve to explain the principles of the disclosure.

DETAILED DESCRIPTION

The following detailed description is exemplary and explanatory only and is not restrictive of the features, as claimed. As used herein, the terms "comprises," "comprising," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." As used herein, the terms "about," "substantially," and "approximately," indicate a range of values within +/−5% of a stated value. The term "distal" refers to a portion farthest away from a user when introducing a device into a subject. By contrast, the term "proximal" refers to a portion closest to the user when placing the device into the subject.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Embodiments discussed below relate to a medical device, such as an ophthalmic device configured for use in the treatment of glaucoma or other eye conditions, and related methods of use. According to some embodiments, the ophthalmic device can have a distal end including a cannula. The cannula can include an inner lumen and one or more outflow orifices configured for delivery of viscoelastic fluid or other substance into a target site of a patient, such as a Schlemm's canal.

According to some embodiments, a tip of the cannula can include a collar disposed around an outer surface of the cannula. The collar can be configured to interact with intraocular tissue in an aqueous outflow pathway of a patient's eye to facilitate positioning of the cannula or facilitate fluid transfer with respect to the eye. For example, the collar can include a radially protruding lip that is fixed or movable to a position proximal to the orifices to provide a structure that facilitates positioning of the orifices of the cannula within or near Schlemm's canal.

According to some embodiments, the collar can be implemented as part of a retractable sleeve. The sleeve can be disposed around the cannula and configured to retract relative to the cannula to pull patient tissue via a suction effect. For example, manipulation of a button or other actuator component disposed on a handle of the device can be configured to retract the sleeve to pull a trabecular meshwork over and around the cannula to penetrate the meshwork with the cannula and open up the canal to facilitate fluid delivery therein.

According to some embodiments, a mechanism can be configured to retract the sleeve or otherwise move a component of the ophthalmic device with a relatively quick and sharp snapping motion. Such a motion can, for example, facilitate suction of the patient's tissue and penetration thereof by the cannula. Additionally or alternatively, the mechanism can operate a pump to inject the fluid or substance through the cannula in concert with the retraction of the sleeve.

These and other embodiments are discussed below in relation to particular examples illustrated in FIGS. 1-11. However, various modifications and alternative applications will be appreciated by those skilled in the art. Thus, the detailed description provided with respect to these figures as well as the description provided above should not be construed as limiting but rather serves to explain various concepts associated with this disclosure.

Figure 1:
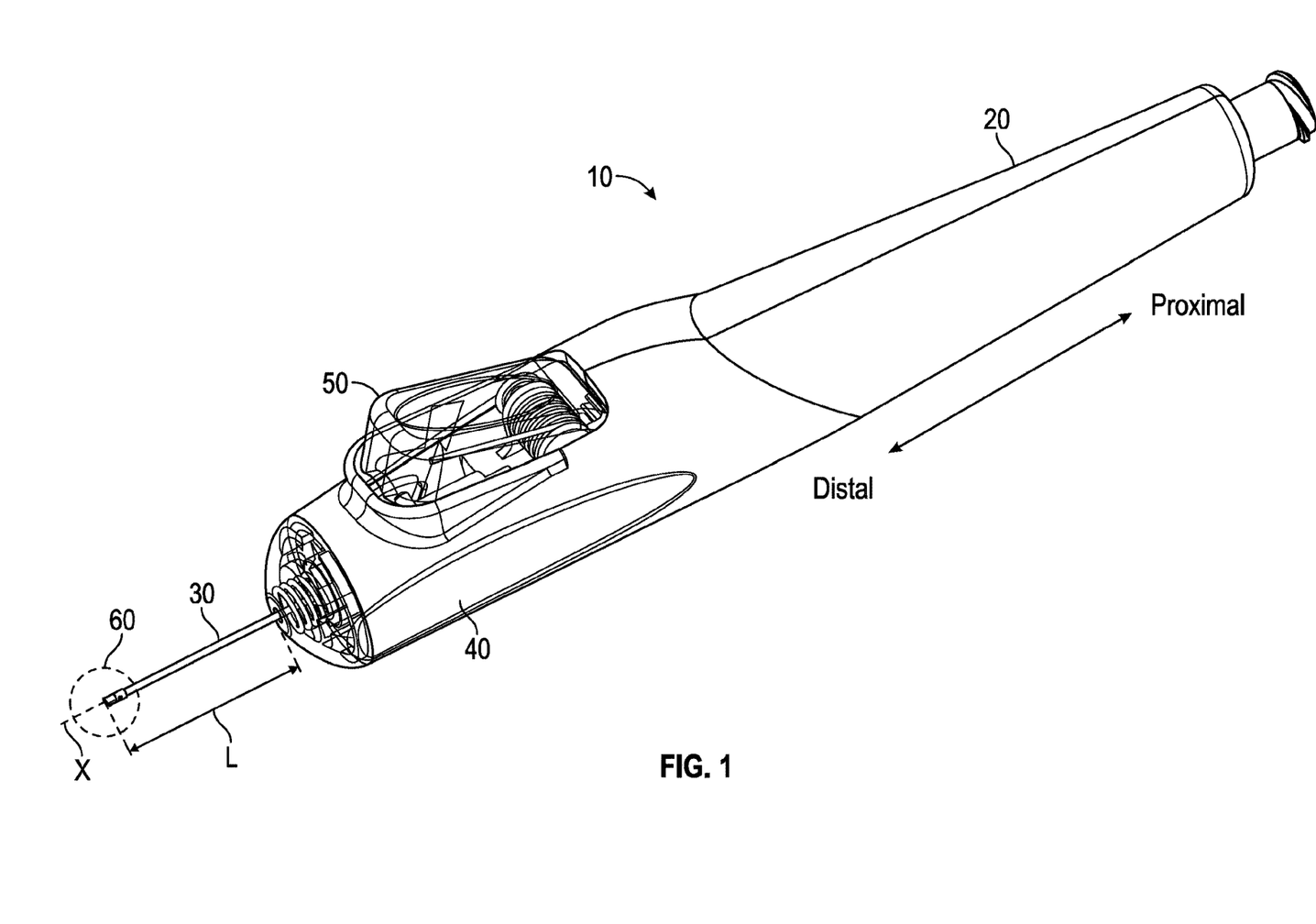
FIG. 1 depicts a perspective view of an example ophthalmic device, according to aspects of the disclosure.

FIG. 1 shows an example of a medical device, and more particularly, shows an example of an ophthalmic device 10. In the example shown, the ophthalmic device 10 is configured as a medical instrument or minimally invasive surgical instrument configured to interact with ocular tissue to facilitate injection of a substance into a Schlemm's canal or other intraocular site of an eye of a patient. However, while examples herein are described with reference to ophthalmic instruments and procedures, it will be appreciated that teachings of the ophthalmic device 10 can be readily applied to or adapted for any of a variety of other medical and non-medical applications. These can include, for example, other medical procedures involving interactions with patient tissue other than in the patient's eye, and other non-medical applications involving fluid injection or transfer.

Referring to FIG. 1, the ophthalmic device 10 can include a handle 20 coupled to an ocular component 30. The ocular component 30 is generally configured for interacting with ocular tissue and/or insertion into an intraocular cavity, such as the anterior chamber of an eye of a patient. The ocular component 30 can be configured to facilitate fluid delivery, tissue manipulation, and/or other interactions with the eye of the patient.

As shown in the example of FIG. 1, the ocular component 30 can include an elongated tubular member protruding from a distal end of the handle 20 and defining a central longitudinal axis X. The ocular component 30 can have a working length L and a diameter that permits insertion into the anterior chamber through a corneal incision or other incision on an eye of a patient. The working length L described herein can be defined as the exposed length or distance of the ocular component 30 protruding from the handle 20, extending from the distal end of the handle 20 to the distal end of the ocular component 30. The working length L can be, for example, in the range of between about 16 millimeters (mm) and 40 mm, or more particularly about 18 mm, although it is contemplated that other dimensions outside of these examples may be suitable in various implementations. The diameter may vary across the working length L or be constant throughout the working length L and can be, for example, in the range of about 100 micrometers (μm) to 1000 μm, or more particularly about 700 μm, although it is contemplated that other dimensions outside of these example may be suitable in various implementations. As shown in the example of FIG. 1, the ocular component 30 can be implemented with a straight geometry (defining a straight central axis X), or the ocular component 30 can be implemented with a curved and/or bent geometry.

With continued reference to FIG. 1, the handle 20 can be implemented as a main body of the ophthalmic device 10 and can be configured to be manipulated by the hand of a user or other operator. For example as shown in FIG. 1, the handle 20 can be implemented as an elongated tubular member having a distal end and a proximal end opposite to the distal end. This can, for example, facilitate gripping or manipulation of the handle 20 using a pencil-grip by a surgeon, although it is contemplated that handle 20 can be implemented with other shapes and configurations, such as pistol-shaped arrangements and/or finger loops. An outer surface of the handle 20 can include finger grips 40 having a contoured shape and/or textured surface (e.g., knurled, ribbed, or other surface textures) to facilitate grasping of the handle 20 by the user. Implementations are also contemplated in which the outer surface of the handle 20 has a straight non-contoured shape and/or a smooth outer surface.

The handle 20 can include or be coupled to an actuator 50. The actuator 50 can be coupled to one or more moving parts of the ophthalmic device 10 to provide one or more operative functions that facilitate performance of an ophthalmic procedure using the device. For example, the actuator 50 can be configured to move one or more parts of the ocular component independently of the handle 20 and/or move two or more moving parts of the ocular component 30 independently of each other. Additionally or alternatively, the actuator 50 can be configured to actuate a pump, plunger, and/or squeeze mechanism for fluid transfer through the ocular component 30. The actuator 50 can, for example, be configured to move the part(s) directly or via an internal mechanism disposed in the handle 20.

In the example shown in FIG. 1, the actuator 50 is implemented as or otherwise includes a mechanical push button disposed on the handle 20 and movable between an un-pressed and pressed position. The push button is shown disposed on a lateral side of the handle which can, for example, facilitate actuation by a surgeon or other user using their thumb and/or index finger when the handle 20 is grasped in the hand of the user during a procedure. Additionally or alternatively, implementations are contemplated in which the push button is disposed in other locations, such as a proximal end of the handle, for example. Implementations are also contemplated in which, instead of or in addition to the push button, the actuator 38 includes a slider, roller wheel, squeeze bulb, and/or any other suitable mechanism that can be manipulated by a user or other operator to actuate a moving part of the ophthalmic device 10.

Figure 2:
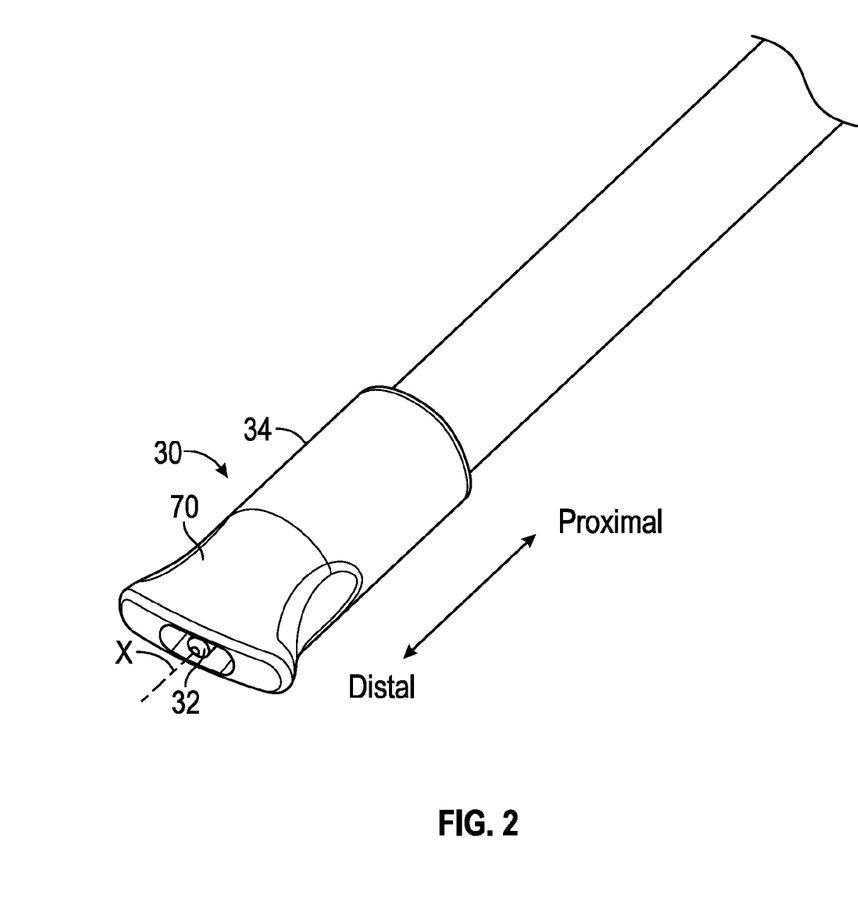
FIG. 2 depicts a perspective view of a distal end of an example of an ophthalmic device that has an inner cannula surrounded by a sleeve, according to aspects of the disclosure.
Figure 3:
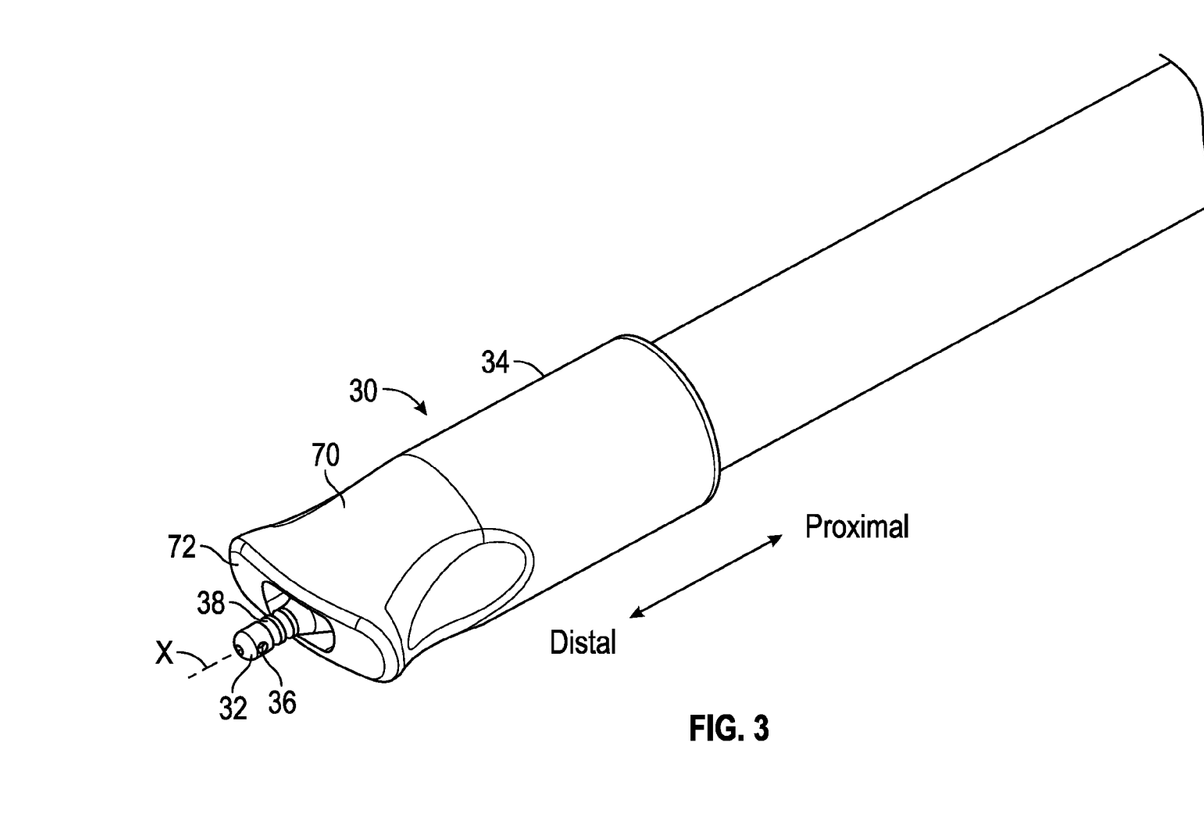
FIG. 3 depicts a perspective view of the distal end of the ophthalmic device of FIG. 2 with the inner cannula protruding from the sleeve, according to aspects of the disclosure.

FIGS. 2 and 3 are enlarged views showing an example of an ocular component 30 that can be included in the ophthalmic device 10. FIGS. 2 and 3 show a distal portion 60 of the ocular component 30 as indicated in FIG. 1.

In the example shown in FIGS. 2 and 3, the ocular component 30 includes a cannula 32 and a sleeve 34 (also sometimes referred to herein as a "sheath"). The sleeve 34 is disposed around the cannula 32 and the cannula 32 is disposed within the sleeve 34. The cannula 32 and the sleeve 34 can, for example, each be implemented as substantially tubular components in which the cannula 32 is disposed coaxially with the sleeve 34 and both the cannula 32 and the sleeve 34 are disposed about the central axis X. The cannula 32 and/or sleeve 34 can, for example, each have a working length equivalent to the working length L of the ocular component 30.

The cannula 32 and the sleeve 34 can be configured for relative movement with respect to each other. For example as shown in FIGS. 2 and 3, the cannula 32 and the sleeve 34 can be moveable with respect to each other between a first configuration (shown in FIG. 2) in which the distal end of the cannula 32 is substantially covered or encased by the sleeve 34, and a second configuration (shown in FIG. 3) in which the distal end of the cannula 32 protrudes distally from the distal end of the sleeve 34. The relative movement can be accomplished by, for example, retraction of the sleeve 34 in a proximal direction independently of the cannula 32 and the handle 20, and/or by deployment of the cannula 32 in a distal direction independently of the sleeve 34 and the handle 20. The actuator 50 can be operatively coupled to the cannula 32 and/or sleeve 34 to move the cannula 32 and/or sleeve 34 with respect to a fixed component of the handle 20.

The cannula 32 can be configured to transfer a fluid or other substance. For example, the cannula 32 can be configured for injection of a viscoelastic fluid, such as sodium hyaluronate or chondroitin sulfate. Viscoelastic fluid is a highly pliable, gel-like material which helps provide enough space for adequate drainage and eye pressure relief by expanding tissue structures away from one another, to re-open or expand a flow path of aqueous humor. Viscoelastic fluid also may clear an obstructed view by expanding bleeding structures away from one another to improve visualization. It is also contemplated that the cannula 32 can be utilized to deliver stem cells, medicaments, gases (e.g., SF6 or C3F8), and/or dyes (e.g., trypan blue dye). Injected stem cells, for example, can initiate growth of healthy tissues within the eye (e.g., to develop healthy trabecular meshwork to enhance drainage of aqueous humor there through). Injected dye, for example, can flow through the trabecular meshwork to enhance visualization of aqueous humor fluid flow to determine which areas, if any, of the trabecular meshwork remain blocked, collapsed, or otherwise impede flow of aqueous humor. Further, while examples are described with respect to the injection of substances, it is contemplated that the cannula 32 can additionally or alternatively be utilized to withdraw substances, such as to withdraw tissue, blood, aqueous humor, or other substances out of a Schlemm's canal or other part of an eye.

As shown in FIG. 3, the cannula 32 can be implemented as a blunt microcannula having a rounded, unsharpened, or otherwise atraumatic tip at its distal end. While implementations are also contemplated in which the cannula 32 is implemented with a sharp needle or traumatic tip at its distal end, the blunt cannula can facilitate penetration of porous patient tissue, such as a trabecular meshwork, while mitigating risk of undesired trauma to surrounding tissue.

The cannula 32 can include one or more orifices 36 disposed on a distal portion of the cannula 32, e.g., disposed on or near the cannula distal end. The one or more orifices 32 can provide one or more fluid transfer ports configured to transfer a fluid or other substance. For example, the one or more orifices 36 can be configured to provide outflow ports for delivery of a viscoelastic substance to a Schlemm's canal of an eye of a patient. As shown in the example of FIG. 3, the one or more orifices 36 can be disposed on a lateral side of the cannula 32 which can provide one or more fluidic channels through a sidewall of the cannula 32 in a direction transverse to the central axis X. Alternatively, other implementations are contemplated in which the orifices are disposed along the central axis X and/or in any other one or more suitable positions to transfer fluid to and/or from an intended target site. The orifices 36 can each have a diameter of between 30 µm to 70 µm, or such as about 50 µm or about 60 µm, although it is contemplated that other orifice diameters outside of these ranges may be suitably used in various implementations. The cannula 32 may include one or more grooves 38 disposed on a distal portion of the cannula 32.

As shown for example in FIGS. 2 and 3, relative movement between the sleeve 34 and the cannula 32 can be configured to selectively cover and uncover one or more of the orifices 36 with the sleeve 34. For example, when in the first configuration shown in FIG. 2, the distal end of the sleeve 34 can be disposed at a first axial position distal to the orifice(s) 36 so as to cover or surround the orifice(s) 36, and when in the second configuration shown in FIG. 3, the distal end of the sleeve 34 can be disposed at a second axial position proximal to the orifice(s) 36 so as to expose the orifice(s) 36 outside of the distal end of the sleeve 34.

The ophthalmic device 10 can further include a collar 70 disposed about a circumference of a tip of the cannula 32 at or near the cannula distal end. For example as shown in FIGS. 2 and 3, the collar 70 can be an integral part of the sleeve 34 or otherwise fixedly coupled to the sleeve 34 at the sleeve distal end, in which case collar 70 can move together with the sleeve 34 so that the collar 70 and the cannula 32 are movable relative to each other. The collar 70 can provide a structure disposed about a circumference of the cannula 32 (e.g., on or around an outer diameter of the cannula 32) that is configured to interact with patient tissue so as to facilitate placement of the cannula 32. For example, a collar face 72 at the distal end of the collar 70 can be configured to manipulate a trabecular meshwork and/or provide a guiding constraint that abuts the trabecular meshwork and/or other tissue neighboring Schlemm's canal. This guiding constraint may, for example, facilitate placement of the orifice(s) 36 to a desired penetration depth within the canal.

In the example shown in FIGS. 2 and 3, the collar 70 is included as part of a distal portion of the sleeve 34. When the sleeve 34 and the cannula 32 are in the second configuration shown in FIG. 3, the collar face 72 provides a lip that protrudes radially outward away from an outer diameter of the cannula 32. The lip can abut a trabecular meshwork or other tissue neighboring Schlemm's canal so that the penetration depth of the cannula 32 is constrained or guided by a predetermined distance between the distal end of the cannula 32 and the lip (or the collar face 72 or the distal end of the collar 70) when the device is in the second configuration.

Figure 4:
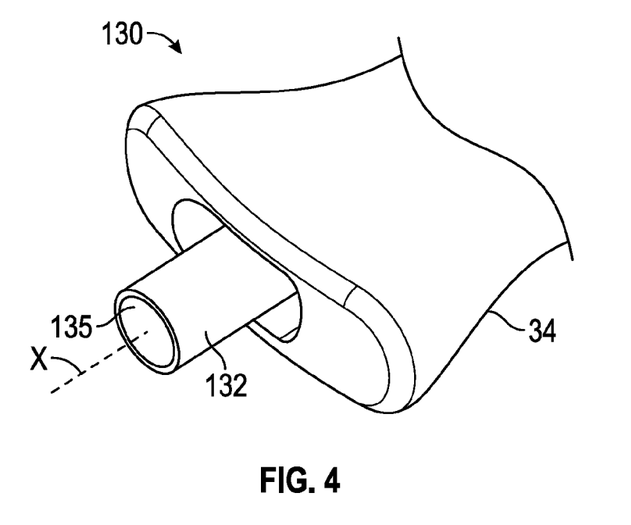
FIG. 4 depicts a perspective view of a distal end of an example of an ophthalmic device showing an inner cannula protruding from a sleeve, according to aspects of the disclosure.

FIG. 4 is an enlarged view showing an example of an ocular component 130 that can be included in the ophthalmic device 10. A cannula 132 and the sleeve 34 can be moveable with respect to each other between a first configuration similar to that shown in FIG. 2, in which the distal end of the cannula 132 is substantially covered or encased by the sleeve 34, and a second configuration (shown in FIG. 4) in which the distal end of the cannula 132 protrudes distally from the distal end of the sleeve 34. The cannula 132 has an outlet port 135 at the distal end of the cannula 132, but does not have any side orifices, such as orifices 36 of cannula 32. Here, fluid is delivered out of the outlet port 135 along the central longitudinal axis X. The cannula 132 is shown as a straight cannula.

Figure 5:
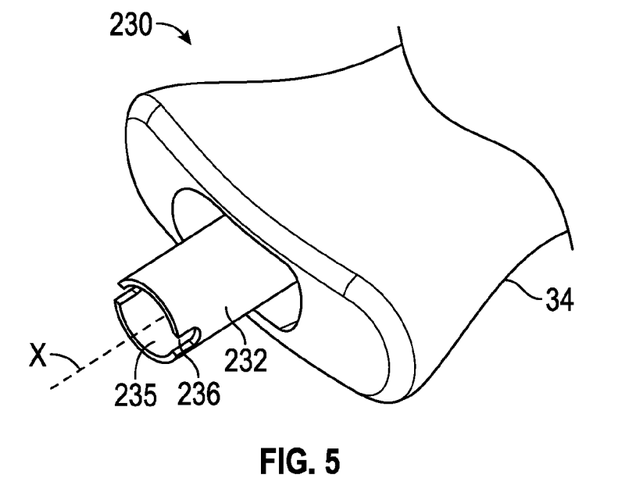
FIG. 5 depicts a perspective view of a distal end of an example of an ophthalmic device showing an inner cannula protruding from a sleeve, according to aspects of the disclosure.
Figure 6:
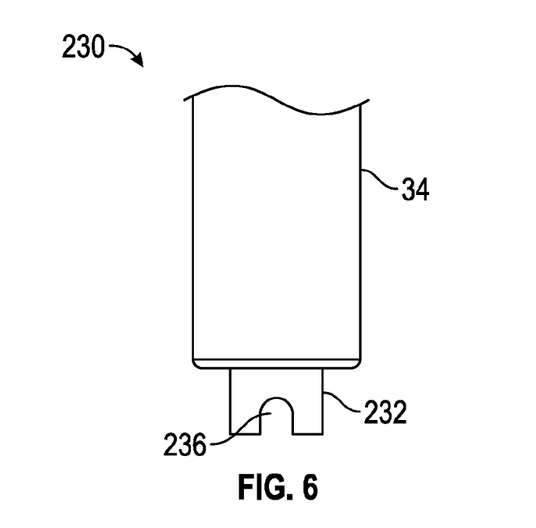
FIG. 6 depicts a side view of the ophthalmic device of FIG. 5, according to aspects of the disclosure.

FIGS. 5 and 6 are enlarged views showing an example of an ocular component 230 that can be included in the ophthalmic device 10. A cannula 232 and the sleeve 34 can be moveable with respect to each other between a first configuration similar to that shown in FIG. 2, in which the distal end of the cannula 232 is substantially covered or encased by the sleeve 34, and a second configuration (shown in FIG. 5) in which the distal end of the cannula 232 protrudes distally from the distal end of the sleeve 34. The cannula 232 has an outlet port 235 at the distal end of the cannula 232, as well as one or more mousehole ports 236 extending in the proximal direction from the distal end of the cannula 232. Here, fluid is delivered out of the outlet port 235 along the central longitudinal axis X, and also out of the mousehole ports 236 generally in directions orthogonal to the central longitudinal axis X. In some aspects of the disclosure, the mousehole ports 236 may be any shape, such as square, rectangular, circular, triangular and the like.

Figure 7:
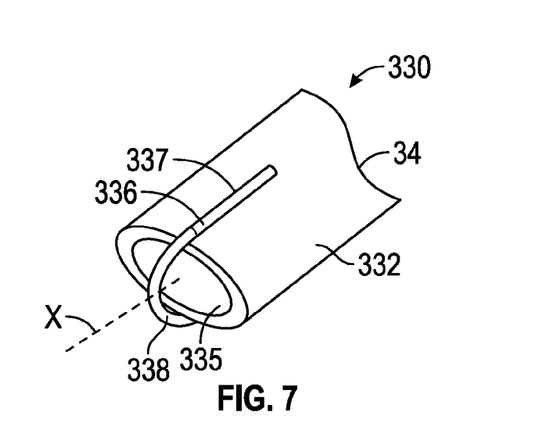
FIG. 7 depicts a perspective view of a distal end of an example of an ophthalmic device showing an inner cannula protruding from a sleeve, according to aspects of the disclosure.
Figure 8:
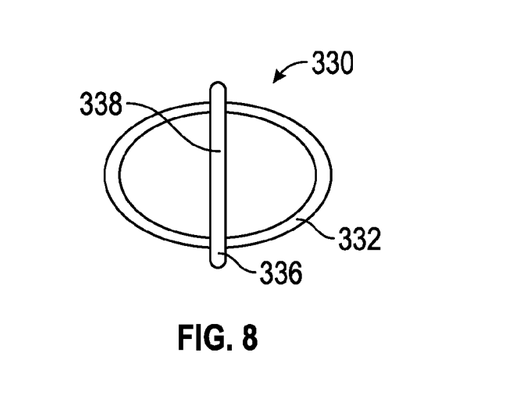
FIG. 8 depicts a front view of the ophthalmic device of FIG. 7, according to aspects of the disclosure.

FIGS. 7 and 8 are enlarged views showing an example of an ocular component 330 that can be included in the ophthalmic device 10. A cannula 332 and the sleeve 34 can be moveable with respect to each other between a first configuration similar to that shown in FIG. 2, in which the distal end of the cannula 332 is substantially covered or encased by the sleeve 34, and a second configuration (shown in FIG. 7) in which the distal end of the cannula 332 protrudes distally from the distal end of the sleeve 34. The cannula 332 has an outlet port 335 at the distal end of the cannula 332, as well as one or more wires 336 extending across the outlet port 335.

In aspects of the disclosure, each end 337 of the wire 336 may be coupled or connected to a portion of the distal end of the cannula 332, where a middle portion 338 of the wire may be bent around the outlet port 335. For example, the middle portion 338 may be configured to bend outward from the most distal portion of the cannula 332 to prevent coring the back wall of the Schlemm's Canal. Here, fluid is delivered out of the outlet port 335 and past the middle portion 338 of the wire 336 along the central longitudinal axis X. In some aspects of the disclosure, the wire 336 may be any size and thickness.

Figure 9:
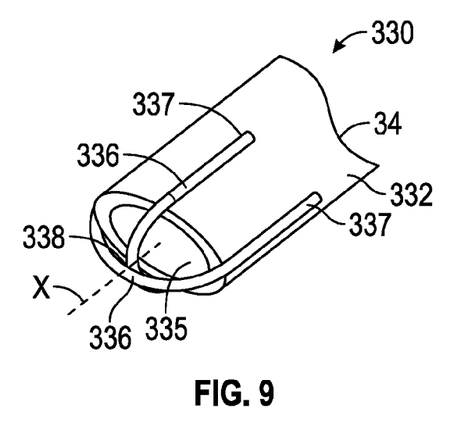
FIG. 9 depicts a perspective view of a distal end of an example of an ophthalmic device showing an inner cannula protruding from a sleeve, according to aspects of the disclosure.

In some aspects of the disclosure, as shown in FIG. 9, multiple wires 336 may cross over one another over the outlet port 335. For example, a first wire 336 may extend (e.g., bow out) further from the distal end of the cannula 332 than a second wire 336, thus providing for the first wire 336 to cross over the second wire 336. As shown in FIG. 9, the wires 336 may be disposed orthogonally to each other in a cross shape. In aspects of the disclosure, any number of wires 336 may be disposed on the cannula 332. In aspects of the disclosure, the wires 336 may cross over one another in any suitable shape.

Figure 10:
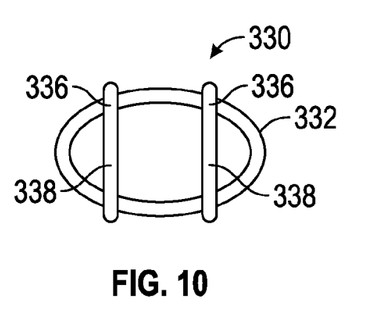
FIG. 10 depicts a perspective view of a distal end of an example of an ophthalmic device showing an inner cannula protruding from a sleeve, according to aspects of the disclosure.

In some aspects of the disclosure, as shown in FIG. 10, multiple wires 336 may be disposed adjacent to one another over the outlet port 335, such as in parallel for example. For example, two wires 336 may be disposed in parallel on either side of the central longitudinal axis X, partitioning the outlet port 335 into three sections. In aspects of the disclosure, any number of wires 336 may be disposed on the cannula 332. In aspects of the disclosure, the wires 336 may be disposed in any position relative to one another without crossing over one another.

Figure 11:
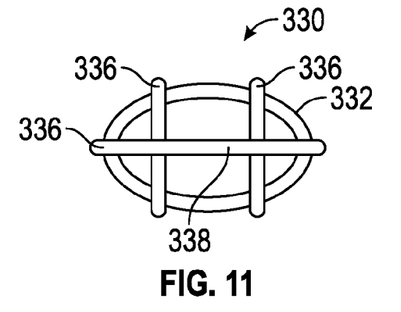
FIG. 11 depicts a perspective view of a distal end of an example of an ophthalmic device showing an inner cannula protruding from a sleeve, according to aspects of the disclosure.

In some aspects of the disclosure, as shown in FIG. 11, a plurality of wires 336 disposed on a distal end of the cannula 332 may include some wires that are disposed adjacent to one another without crossing over one another (e.g., two parallel wires) and at least one more wire that crosses over at least one of the other wires (e.g., orthogonally cross over two parallel wires).

In one or more embodiments, an ophthalmic device includes a cannula having a cannula distal end, a lumen, and at least one fluid outlet, the cannula configured to deliver a fluid; a sleeve disposed around the cannula and having a sleeve distal end; a handle coupled to the sleeve and the cannula, the handle having an actuator; and a retracting mechanism coupled to the actuator and configured to retract the sleeve relative to the cannula.

In aspects of the disclosure, the cannula is a straight tubular cannula disposed coaxially with the sleeve along a central longitudinal axis. In aspects of the disclosure, the cannula distal end is covered by the sleeve in an inactivated position of the ophthalmic device, and wherein the cannula distal end protrudes distally from a distal end of the sleeve in an activated position of the ophthalmic device. In aspects of the disclosure, the at least one fluid outlet comprises a single outlet port disposed at the cannula distal end.

In aspects of the disclosure, the at least one fluid outlet comprises: an outlet port disposed at the cannula distal end; and one or more mousehole ports disposed at the cannula distal end and extending along a portion of the cannula in a proximal direction. In aspects of the disclosure, the outlet port and the one or more mousehole ports form a continuous outlet. In aspects of the disclosure, the continuous outlet is configured to deliver fluid out of the outlet port along a central longitudinal axis and out of the one or more mousehole ports in directions orthogonal to the central longitudinal axis. In aspects of the disclosure, at least one of the one or more mousehole ports is an arched rectangle shape. In aspects of the disclosure, at least one of the one or more mousehole ports is a square shape. In aspects of the disclosure, at least one of the one or more mousehole ports is a rectangle shape. In aspects of the disclosure, at least one of the one or more mousehole ports is a semicircle shape.

In aspects of the disclosure, a wire is disposed on the cannula distal end, wherein both ends of the wire are connected to outer surfaces of the cannula and a middle portion of the wire crosses over the single outlet port. In aspects of the disclosure, the middle portion of the wire is arched outward past the cannula distal end. In aspects of the disclosure, a plurality of wires are disposed on the cannula distal end, wherein for each wire both ends of the wire are connected to outer surfaces of the cannula and a middle portion of the wire crosses over the single outlet port. In aspects of the disclosure, at least two of the plurality of wires are disposed adjacent one another. In aspects of the disclosure, the plurality of wires are disposed adjacent one another in parallel.

In aspects of the disclosure, at least two of the plurality of wires are disposed crossing one another. In aspects of the disclosure, a first of the two wires extends further distally outward from the cannula distal end than a second of the two wires. In aspects of the disclosure, first and second wires of the plurality of wires are disposed adjacent one another without crossing over one another, and wherein a third wire of the plurality of wires is disposed to cross over at least one of the first and second wires. In aspects of the disclosure, the actuator comprises a push button configured to one of: actuate retracting the sleeve relative to the cannula; and actuate a fluid transfer mechanism to cause fluid transfer through the cannula.

It is understood that any specific order or hierarchy of blocks in the methods of processes disclosed is an illustration of example approaches. Based upon design or implementation preferences, it is understood that the specific order or hierarchy of blocks in the processes may be rearranged, or that all illustrated blocks be performed. In some implementations, any of the blocks may be performed simultaneously.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. An ophthalmic device comprising:
    a cannula having a cannula distal end, a lumen, and at least one fluid outlet comprising an outlet port disposed at the cannula distal end, the cannula configured to deliver a fluid;
    at least one wire disposed on the cannula distal end, wherein both ends of the wire are connected to outer surfaces of the cannula and a middle portion of the wire crosses over the outlet port;
    a sleeve disposed around the cannula and having a sleeve distal end;
    a handle coupled to the sleeve and the cannula, the handle having an actuator; and
    a retracting mechanism coupled to the actuator and configured to retract the sleeve relative to the cannula.

2. The ophthalmic device of claim 1, wherein the cannula is a straight tubular cannula disposed coaxially with the sleeve along a central longitudinal axis.

3. The ophthalmic device of claim 1, wherein the cannula distal end is covered by the sleeve in an inactivated position of the ophthalmic device, and wherein the cannula distal end protrudes distally from a distal end of the sleeve in an activated position of the ophthalmic device.

4. The ophthalmic device of claim 1, wherein the at least one fluid outlet comprises:
   an outlet port disposed at the cannula distal end; and
   one or more mousehole ports disposed at the cannula distal end and extending along a portion of the cannula in a proximal direction.

5. The ophthalmic device of claim 4, wherein the outlet port and the one or more mousehole ports form a continuous outlet.

6. The ophthalmic device of claim 5, wherein the continuous outlet is configured to deliver fluid out of the outlet port along a central longitudinal axis and out of the one or more mousehole ports in directions orthogonal to the central longitudinal axis.

7. The ophthalmic device of claim 4, wherein at least one of the one or more mousehole ports is an arched rectangle shape.

8. The ophthalmic device of claim 4, wherein at least one of the one or more mousehole ports is a square shape.

9. The ophthalmic device of claim 4, wherein at least one of the one or more mousehole ports is a rectangle shape.

10. The ophthalmic device of claim 4, wherein at least one of the one or more mousehole ports is a semicircle shape.

11. The ophthalmic device of claim 1, wherein the middle portion of the wire is arched outward past the cannula distal end.

12. The ophthalmic device of claim 1, the at least one wire comprising a plurality of wires disposed on the cannula distal end, wherein for each wire both ends of the wire are connected to outer surfaces of the cannula and a middle portion of the wire crosses over the outlet port.

13. The ophthalmic device of claim 12, wherein at least two of the plurality of wires are disposed adjacent one another.

14. The ophthalmic device of claim 12, wherein the plurality of wires are disposed adjacent one another in parallel.

15. The ophthalmic device of claim 12, wherein at least two of the plurality of wires are disposed crossing one another.

16. The ophthalmic device of claim 15, wherein a first of the two wires extends further distally outward from the cannula distal end than a second of the two wires.

17. The ophthalmic device of claim 12, wherein first and second wires of the plurality of wires are disposed adjacent one another without crossing over one another, and wherein a third wire of the plurality of wires is disposed to cross over at least one of the first and second wires.

18. The ophthalmic device of claim 1, wherein the actuator comprises a push button configured to one of:
   actuate retracting the sleeve relative to the cannula; and
   actuate a fluid transfer mechanism to cause fluid transfer through the cannula.

\* \* \* \* \*